H. W. LIGON.
GIN SAW SPACE BLOCK SIZING MACHINE.
APPLICATION FILED JUNE 21, 1912.
1,089,566.
Patented Mar. 10, 1914.
2 SHEETS—SHEET 1.
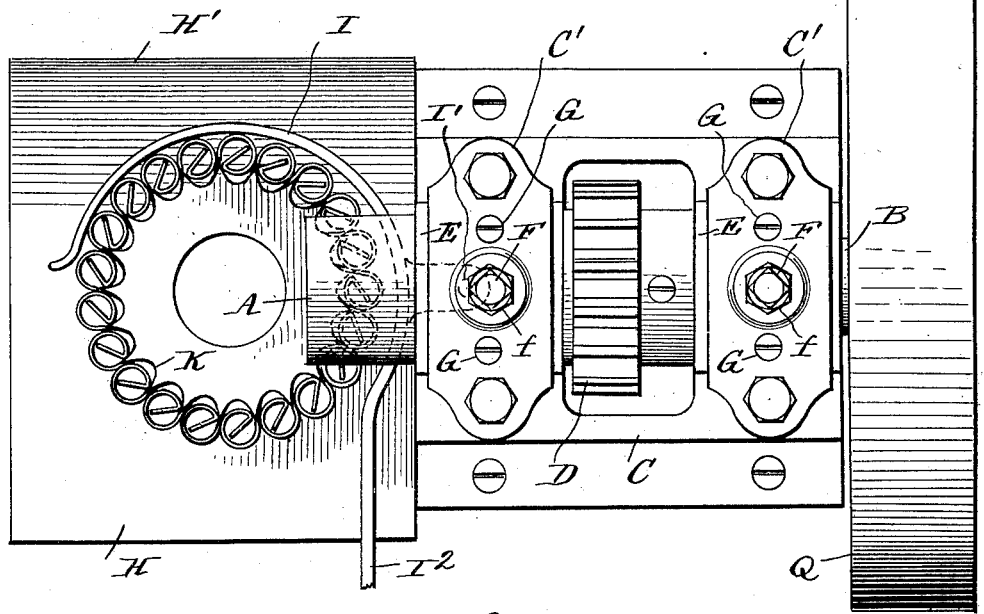
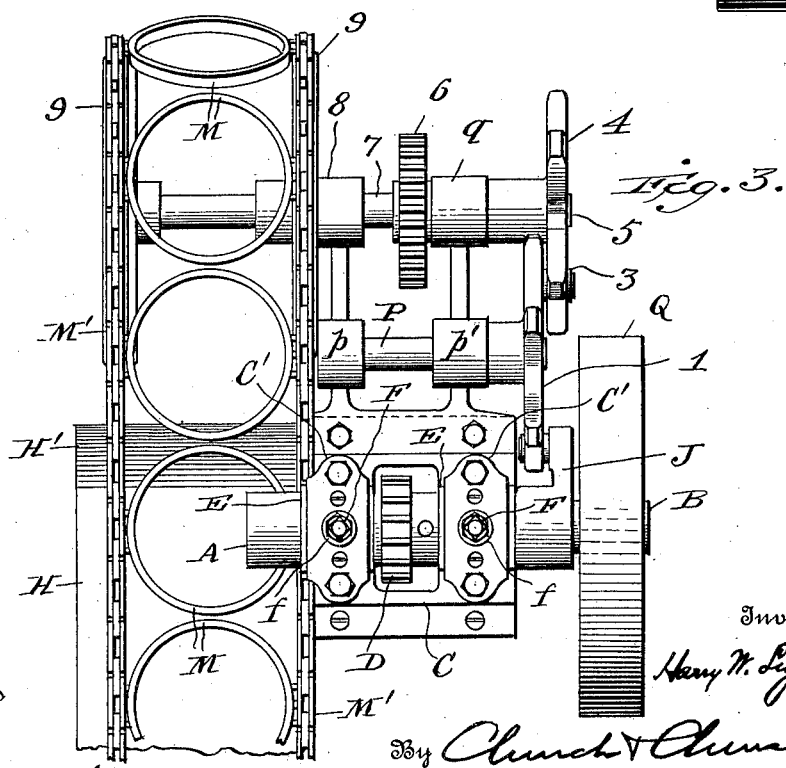

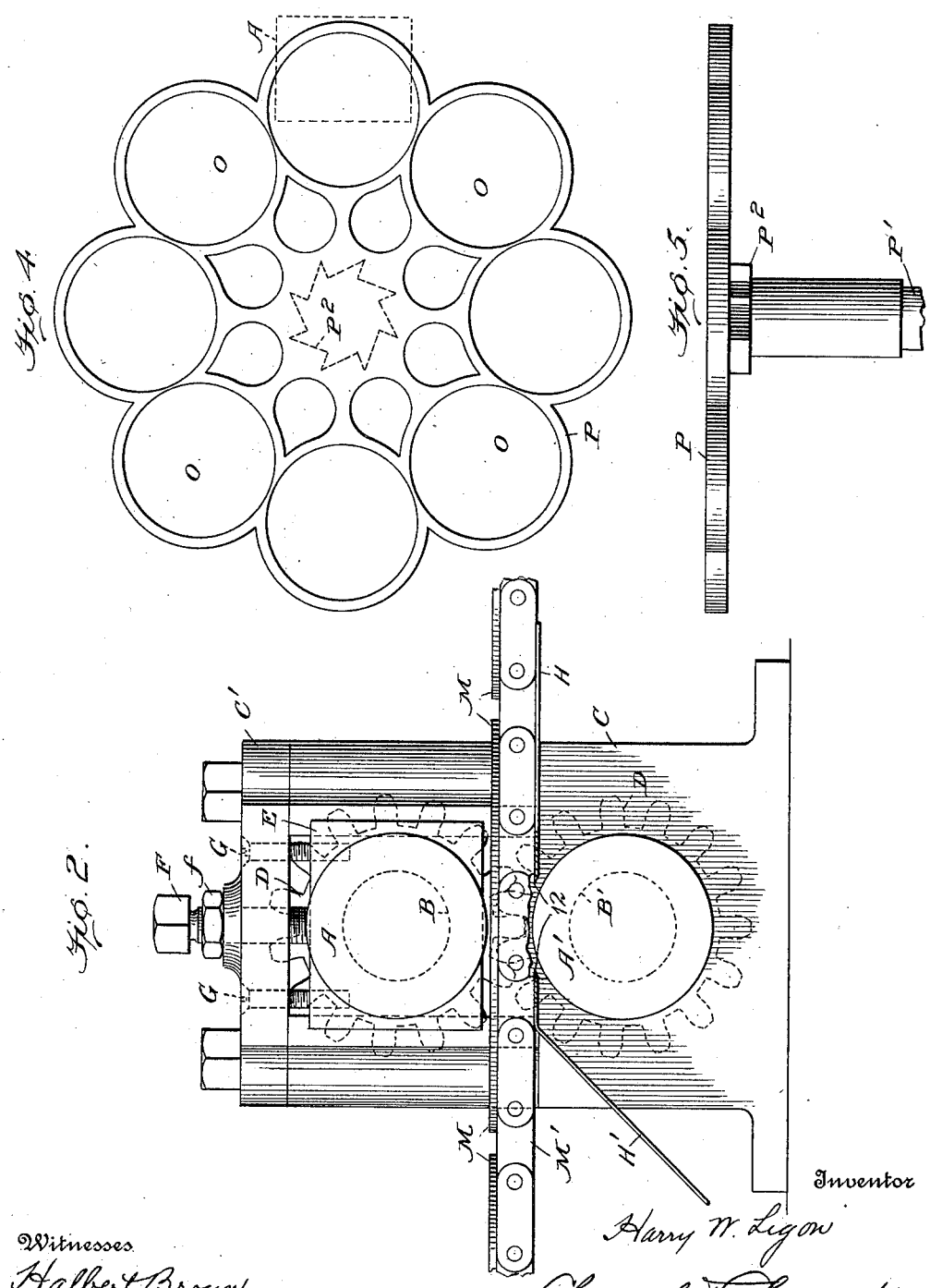

UNITED STATES PATENT OFFICE.

HARRY W. LIGON, OF ATLANTA, GEORGIA, ASSIGNOR TO CONTINENTAL GIN COMPANY, OF BIRMINGHAM, ALABAMA, A CORPORATION OF DELAWARE.

GIN-SAW-SPACE-BLOCK-SIZING MACHINE.

1,089,566.     Specification of Letters Patent.     Patented Mar. 10, 1914.

Application filed June 21, 1912. Serial No. 705,115.

*To all whom it may concern:*

Be it known that I, HARRY W. LIGON, a citizen of the United States, residing at Atlanta, in the county of Fulton and State of Georgia, have invented certain new and useful Improvements in Gin-Saw-Space-Block-Sizing Machines; and I do hereby declare the following to be a full, clear, and exact description of the same, reference being had to the accompanying drawings, forming part of this specification, and to the figures and letters of reference marked thereon.

In assembling saws on their carrying shaft for saw cotton gins, the saws are spaced from each other by means of so-called spacing blocks, said blocks being usually of circular form and adapted to fit on the shaft between adjacent saws. In accordance with modern practice, these spacing blocks are formed of sheet metal, the spacing portions being bent or positioned to present the sheet metal edgewise longitudinally of the saw shaft, the arrangement being such that clamping pressure is resisted by the edgewise compression of the metal in the spacing blocks, and it is of course highly desirable, if not essential, that the blocks shall be of uniform thickness lengthwise of the shaft in order that the pressure may be uniformly distributed on the saws, buckling of the saws prevented, and the saws held firmly in planes truly transverse to the axis of the shaft. While the blocks may be formed with a fair degree of accuracy, with usual cutting and die mechanism, yet it is found that should the cutters become dull, or any looseness exist in the forming devices, the blocks are liable to vary some thousandths of an inch in thickness, variations of from eight to twelve thousandths having been noted.

Such a variation produces undesirable results along the lines above indicated, and it is the object of the present invention to provide a machine which will size the blocks with extreme accuracy and in practice reduce the variations to within one-half of a thousandth of an inch.

The invention consists in certain novel details of construction and combinations and arrangement of parts, all as will be hereinafter described and pointed out particularly in the appended claims.

Referring to the accompanying drawings, Figure 1 is a top plan view of a sizing machine embodying the hand operated feeding mechanism. Fig. 2 is an elevation looking at the other ends of the sizing rolls; Fig. 3 is a top plan view of the sizing machine showing the automatic feeding mechanism. Fig. 4 is a plan view of a somewhat different form of feder; and Fig. 5 is an elevation of the feeder shown in Fig. 4.

Like letters of reference in the several figures indicate the same parts.

The machine embodies in its construction a pair of sizing rolls A, A' formed integral with or mounted on the ends of shafts B, B' journaled in very rigid bearings in a heavy head block C which may be suitably bolted down to a bed plate or table. In the preferred construction two sets of spaced bearings are provided for each shaft, and intermediate said bearings the shafts are provided with intermeshing gear wheels D, said gear wheels having teeth of sufficient length to permit of a small adjustment of the upper shaft. With this adjustable feature in contemplation the bearings for the upper shaft are formed in blocks E mounted to slide vertically in the head C, and adapted to be adjusted and held against upward movement by set screws F having lock nuts $f$ thereon, while downward movement is limited by screws G, all of said screws, it will be understood, being adapted to work through cross pieces C' which are bridged across the head block C and are firmly bolted thereto. The surfaces of the sizing rolls A A' are true cylindrical surfaces and they project from the head block with their axes parallel, there being no obstruction interposed at the outer ends of the rolls, whereby spacing blocks may be entered from the ends, or by a rolling action, while portions of the blocks project beyond the ends of the roll.

A table or support H is preferably provided having a plane upper surface preferably a very slight fraction of an inch below the upper side of the periphery of the lower roll, and said table preferably merges in an incline H' at one edge so that space blocks sized by the rolls may be advanced and discharged down the incline. The lower roll A' projects through the table H, as indicated in Fig. 3 by the numerals 12, 12.

Space blocks, the sizing of which is to be performed by the present machine are of circular contour, and the peripheral or spacing portions of the blocks are adapted to be acted on by the proximate surfaces of the rolls. During such action the space blocks are adapted to rotate so as to subject all portions of the periphery to the action of the rolls. During the operation the space blocks are supported in a plane parallel with the roll axes and intermediate the rolls, so that provision must be made whereby not only will the blocks be held in a proper plane, but they must be so supported that they may rotate on an axis normal to the axes of the rolls, and at the same time in order to increase the output of the machine, provision should be made whereby they may be readily fed in between the rolls, and when sized quickly discharged.

The simplest form of mechanism for supporting the space blocks while permitting of the movements referred to, while requiring that the blocks shall be presented and the parts moved by hand, consists of a curved guiding support, which extends around a substantial portion of the diameter of the blocks, shown in Fig. 1, where I is a curved guide pivotally mounted at I' and adapted to be swung on its pivot by a hand projection or handle I², the plane of movement of the guiding support being parallel with the plane of movement of the space blocks, one of which is indicated generally by the line K. The guide I, it will be understood, is of less width vertically than the space between the rolls, and in operation, a space block is allowed to feed into the position shown in Fig. 1 and seat against or within the guide I, whereupon the rotation of the sizing rolls will rotate the space block, and if said rolls are accurately positioned they will reduce the space block to a uniform thickness, the reduction and sizing proceeding progressively around the periphery of the block as the block is rotated in the guide by the rotation of the rolls. When the sizing is completed the guide I is allowed to swing to one side so that the space block will pass from between the rolls and slide down the incline H'.

In the preferred type of machine as shown in Fig. 3 instead of embodying a guide adapted to be manipulated by hand for holding the space blocks in operative position with respect to the rolls, an automatic feeding mechanism is provided consisting of a crank J, mounted on the shaft B, which imparts motion to an idler star wheel 1, mounted on shaft P which is supported in bearings $p$, $p'$. The idler star wheel is provided with a stud 3 which actuates star wheel 4 carried on shaft 5, said shaft being supported in bearing $q$. On the opposite end of shaft 5 is mounted gear wheel 6 meshing with a similar gear (not shown) carried on shaft 7. Shaft 7 is mounted in bearing 8 and is provided with sprocket wheels 9, 9. A series of rings M linked together by connecting links M' to form an endless chain engage the sprocket wheels 9 and are adapted to be fed intermittently over the table H by the operation of the feeding mechanism hereinbefore described in such a manner that the rings come to rest when in position between the sizing rolls so that a space block held by a ring in operative position will be sized as before pointed out.

Instead of a series of guiding rings linked together as just described, a feed wheel such as illustrated in Figs. 4 and 5 may be employed. By referring to these figures, it will be seen that a circular series of rings or openings O' are formed in the peripheral portion of a wheel E, the openings O being of such size as to receive the space blocks and by mounting said wheel in position whereby its peripheral portion will travel through between the sizing rolls, the space blocks placed in the openings O will be successively brought into position to be acted on by the sizing rolls, and each space block will be free to rotate on its own axis within the guiding openings of the wheel P. This wheel which forms the guiding support for the space blocks may be conveniently mounted on a vertical shaft P' and rotated by the engagement of a suitable pawl mechanism with a ratchet wheel P³ formed on or connected with the under side of the wheel or guide.

Having thus described my invention, what I claim as new and desire to secure by Letters Patent of the United States, is:—

1. A gin saw space block sizing machine, embodying a pair of rolls, said rolls being arranged horizontally one above the other and having parallel axes, and supported in bearings at one end only, gearing for rotating the rolls in opposite directions at the same speed, and a guiding retainer in which the blocks may rotate on their own axes, said retainer extending in a plane parallel with and intermediate the axes of the rolls.

2. A gin saw space block sizing machine embodying a pair of parallel, horizontal spaced rolls geared to rotate in unison in opposite directions, a movable curved guiding retainer extending in a plane parallel with and intermediate the axes of the rolls, and means whereby said guiding retainer may be moved to feed the blocks to and away from the sizing rolls.

3. In a gin saw space block sizing machine, the combination with spaced rolls supported at one end arranged horizontally one above the other on parallel axes and geared to rotate in unison in opposite directions, of means for rotatably supporting a spacing block in a plane parallel with and intermediate the axes of the rolls, with its center beyond the ends of the rolls, whereby the block will be rotated on an axis at right angles to the axis of the rolls, and its peripheral portions sized progressively by the rolls.

4. In a gin saw space block sizing machine, the combination with the rolls having horizontal parallel axes, said rolls supported at one end only and geared to rotate in unison in opposite directions, of a space block support extending parallel with the axes of the rolls, and a curved space block guide movable parallel with and above said support in a plane intermediate the rolls and adapted to retain a block with its edge and one side of the center between the ends of the rolls.

5. In a gin saw space block sizing machine, the combination with two spaced rolls, said rolls arranged in horizontal relation and having parallel axes, and geared to rotate in opposite directions at the same speed, of a supporting table lying in a plane parallel to the axes of the rolls, a guiding feeder movable over said table and between the rolls, said feeder having circular guides for the reception of the blocks, whereby the blocks may rotate while being acted upon by the rolls.

6. In a gin saw space block sizing machine, the combination with parallel sizing rolls, having horizontal axes, said rolls being supported at one end and geared to rotate in unison in opposite directions, of a supporting table extending in a plane parallel to the axes of the rolls, an incline at one edge of said table, a guide movable over said table and between the rolls, said guide having circular openings therein for the reception of space blocks, and means for rotating the rolls and advancing the guide.

7. In a gin saw space block sizing machine, provided with superposed horizontal spaced rolls, said rolls having parallel axes and gears to rotate in unison in opposite directions, a guiding retainer between the rolls, means for intermittently advancing the retainer, said retainer being timed to present one of the space blocks to the action of the rolls, at each successive movement.

HARRY W. LIGON.

Witnesses:
J. CALEB CLARKE,
GEO. WESTMORELAND.

---

Copies of this patent may be obtained for five cents each, by addressing the "Commissioner of Patents, Washington, D. C."